United States Patent [19]

Fauske

[11] Patent Number: 5,229,075
[45] Date of Patent: Jul. 20, 1993

[54] REACTIVE SYSTEM SCREENING TOOL
[75] Inventor: Hans K. Fauske, Hinsdale, Ill.
[73] Assignee: Westinghouse Electric Corp., Pittsburgh, Pa.
[21] Appl. No.: 826,274
[22] Filed: Jan. 24, 1992

Related U.S. Application Data

[63] Continuation of Ser. No. 256,719, Oct. 12, 1988, abandoned.

[51] Int. Cl.$^5$ .............................................. B01J 19/00
[52] U.S. Cl. ........................................ 422/130; 436/34
[58] Field of Search ........................ 422/130; 436/34; 374/33

[56] References Cited
U.S. PATENT DOCUMENTS
4,670,404  6/1987  Swift et al. ........................ 422/130

Primary Examiner—Peter Chin
Attorney, Agent, or Firm—J. C. Valentine

[57] ABSTRACT

A test apparatus for studying the behavior of chemical reactants is disclosed.

4 Claims, 2 Drawing Sheets

REACTIVE SYSTEM SCREENING TOOL

This application is a continuation of application Ser. No. 07/256,719 filed Oct. 12, 1988.

BACKGROUND OF THE INVENTION

The present invention relates generally to methods and apparatus for chemical engineering analysis, and particularly to a tool for screening chemically reactive systems in assessing their requirements for relief systems.

Over the years, a significant concern in the design and manufacture of chemical process systems and equipment is the provision of what may be termed emergency relief systems. By "emergency relief system" is meant any construction or operational feature of a reactor system whereby excessive pressure build-up may be avoided and venting of the reactor vessel achieved so as to minimize the likelihood of explosion and consequent injury to personnel and/or damage to process equipment.

As in many other fields, a paramount consideration in designing equipment in the chemical engineering field is that such equipment provide safety for operating personnel. In addition, of course, because of the high cost of chemical process equipment, it has become increasingly important to ensure that the equipment will operate safely and without damage to itself in the event of uncontrolled or runaway reactions. The consequences of such accidents depend on their the nature, but range from those which may involve injury to personnel down to those which merely waste or damage some or all of the chemicals being processed.

Aside from the previously mentioned standpoints of avoiding injury to personnel, there has been an increasing concern with the possibility of damage to the environment surrounding chemical manufacturing operations. Environmental damage may range from relatively minor to major damage to downstream or surrounding equipment within a controlled area, damage to the exterior atmosphere, the ground water table, or to buildings or other structures in the near vicinity of the reactor vessel.

Because the nature of chemical processes is not entirely predictable, particularly if there is a human or mechanical malfunction in carrying out the reaction in question, there is both a desire and a need to avoid the damaging consequences of runaway chemical reactions. In some cases, such reactions may create explosions or rapid discharges of vessel contents; in this connection there has been a concern with confining the contents of materials discharged from a reactor vessel to a predetermined area, and where possible, eliminating the conditions which act to aggravate or regenerate the offending condition. In other words, where there is an untoward pressure rise in a reaction vessel, and this pressure or temperature rise a further increase in the reaction rate, immediate steps must be taken to lower the reaction rate or the runaway condition will continue or become worse.

A great deal of effort has been devoted to developing emergency relief systems which may be simply characterized as pressure and/or temperature relief systems which are self actuating in the event of a runaway reaction or other emergency. Creating reactor safety, however, like other industrial concerns, should preferably be achieved with considerations of reliability and low cost in mind. In this connection, it is highly desirable that means be available to generate safe but not overly conservative estimates of the requirements for a relief system. As in other engineering applications, a balance must be struck between a vent or pressure relief system that is so large or oversized that its capacity will never be required, and a system which creates the serious risks of explosion or damage by reason of being undersized.

Preferably, design parameters for relief systems should be able to be established under reduced scale test conditions, so that resort need not be had to creating a full scale, runaway reaction in order to determine vent sizing or other safety measures. A great deal of research in the area of providing proper relief systems has therefore been directed to providing methods and apparatus wherein an accurate scale-up of experimental findings may be made. In other words, where a miniature or small scale test is to be relied upon, it must be established with a high degree of certainty that the small scale reaction under consideration serves as an accurate model for a fully scaled-up reaction.

Referring to another aspect of the need for proper relief system design, because of high capital costs in chemical engineering, and because of the variety of new reactions which are brought on stream in the industry from time to time, it is not always possible to provide a dedicated system of reactor vessels and controls for every reaction which it is desired to carry out on a commercial basis. Therefore, there has been a strong desire in the industry to adapt existing equipment, i.e., equipment designed for a given reaction, for use in other chemical reactions. Each time a new application for the equipment is considered, relief system requirements must be evaluated. In achieving the economies made possible by multiple use of equipment use, however, it is essential that safety considerations not be compromised.

A series of standards and protocols has already been developed for making the calculations necessary to determine whether the venting capacity and mechanism of an existing system is adequate for the type of reaction which it is anticipated will take place in the vessel.

However, while it has been possible to make relatively accurate vent sizing calculations using such test standards and protocols, and to possibly validate such calculations by performing certain of such tests and related experiments, these tests involve the use of unduly expensive equipment and test methods. One such method and apparatus is described and claimed in U.S. Pat. No. 4,670,404. Often, determining proper vent sizing has required using equipment which is very expensive in relation to the economy sought to be achieved by solving the vent sizing problem.

According to the invention, it has been postulated and verified that much simpler test methods and apparatus may be utilized in analyzing various chemical reactions so that what may be termed a screening test may be performed on reactive materials using a screening "tool" for the purpose of determining whether existing relief systems are appropriate. Almost always, the screening tests eliminate the need for expensive and complex studies to validly determine vent size and relief system design.

In accordance with the invention, a reactive system screening tool or apparatus and a method of using it have been developed, whereby performance of simple tests in relatively inexpensive apparatus will enable the user to determine that an existing or proposed relief system design is adequate. The tests involve determining self heat rate or energy release rate for one class of reaction and the gas generation rate for another class of reaction. These values are used in other calculations to determine the adequacy of existing relief systems.

More particularly, according to the invention, it is possible to prepare a small sample of the chemicals which will be used in the full-sized reaction vessel in question, place the sample in the test equipment of the invention and perform a relatively simple analysis in this apparatus.

Thereafter, using the experimental data thus gained, a first formula is applied. Where the reaction system is a vapor or tempered vapor system, this formula provides the energy release rate term applicable to that reaction. In the case where a "gassy" or "hybrid" reaction system is being considered, substantially the same procedure is followed, except that the term developed is the gas generation volume rate term applicable to the reaction.

After the correct values of these rate terms (the "Q" terms) have been determined experimentally, another applicable formula is used to obtain vent size requirement information. This vent size requirement information is then compared to the existing vent size to determine whether the reaction vessel is adequately protected for the anticipated application of the process equipment. If a new vessel is being constructed, the vent system is simply sized from the formula. These formulas and their application are set forth and described in detail elsewhere herein.

Using the apparatus and method of the present invention, it is rarely necessary to resort to full scale testing or even the expensive reduced scale analytical methods of the prior art. The screening tool and method of the invention do not rule out the subsequent use of more complex analytical methods and apparatus where such analysis is indeed necessary, but it has been shown that the need for such complex test may be obviated in a great majority of cases.

Accordingly, it is an object of the present invention to provide a simple laboratory apparatus and method to determine the relief system requirements for various reactive chemical systems.

Another object of the invention is to provide an improved laboratory apparatus which may be constructed of readily available materials at low cost, and yet which will yield reliable test data capable of valid extrapolation for purposes of determining vent sizing or other requirements of a pressure relief system.

A still further object of the invention is to provide a method of operating a simplified apparatus to duplicate existing or projected reactor vessel conditions and thus provide the data necessary to establish or validate relief system requirements.

A further object is to provide a method of relief system sizing which is able to be scaled up with accuracy.

Another object of the invention is to provide a simplified apparatus and method for economically determining whether proposed relief system requirements are adequate, inadequate, or whether further study by more exacting analytical tools is required.

A still further object of the invention is to provide an apparatus which may be manufactured and sold to end users at reasonable costs, and which may be operated to generate relatively accurate, repeatable data useful in predicting actual reaction conditions for a variety of reactions.

Yet another object is to provide a so-called screening tool which employs a novel combination of readily available economical equipment.

Another object of the invention is to provide an apparatus and method which is equally capable of use in so-called vapor, tempered vapor, gassy or hybrid reaction systems.

A further object of the invention is to provide an analytical method which will generate easy-to-interpret date concerning rates of energy released or pressure rise, which data are used to analyze various reactions, including so-called gassy reactions.

A still further object is to provide a screening tool and method which enables determination of relief system adequacy to be made for non-dedicated reaction vessels.

Yet another object is to provide a method of analysis wherein a source term reflecting energy release rate and/or gas generation rate may be found, and wherein this term may be used in determining vent sizing or related relief system data.

The foregoing and other objects and advantages of the invention are achieved in practice by providing an apparatus which includes an exterior containment vessel for providing a controlled atmosphere, a receiver for reactive chemicals disposed in the containment vessel, means for introducing reactants into the vessel from a outside the containment vessel and for controlling or measuring the atmosphere existing within the containment vessel, means for insulating the near environs of the receiver, for heating the contents of the receiver under careful control, and for measuring the temperature of the receiver contents and/or the pressure within the containment vessel, and preferably, means for agitating the chemicals in the receiver; the apparatus preferably also includes appropriate means for reading and, recording the conditions in the receiver and/or the containment vessel.

The method of the invention includes subjecting the contents of a miniature reaction vessel to an atmosphere wherein pressure and temperature may be controlled or observed, measuring the rate of temperature rise in the reactants and/or the rate of pressure increase in the containment vessel to determine the behavior of the reactor contents as conditions change, and using the measured energy release rate or the gas generation rate in certain calculations which take account of the scaled up size of the full scale reaction so that relief system requirements can be established for comparison to existing relief system capabilities provided by existing equipment, or for use in designing new equipment.

The exact manner in which the foregoing and other objects of the invention are achieved in practice will become more clearly apparent when reference is made to the following detailed description of the preferred methods of practicing the invention and the apparatus embodying the invention, which methods and apparatus are set forth by way of example and shown in the accompanying drawings, wherein like references numbers indicate corresponding parts throughout.

PREFERRED METHODS AND APPARATUS FOR PRACTICING THE INVENTION

While the methods and apparatus of the present invention are capable of being used in different applications, a description of a preferred form of apparatus will be given wherein a miniature size receiver of low thermal mass is placed in a containment vessel and filled with reactants whose behavior is to be studied. The apparatus permits simplified control measurement and recording of the pressure-temperature parameters of a given chemical reaction. The method of developing and analyzing data applicable to different kinds of reactions will be set forth by way of example. Reference to prior art methods used to generate counterpart information in the prior art may also be made for contrast to the simplified methods and apparatus of the present invention.

Figure 1:
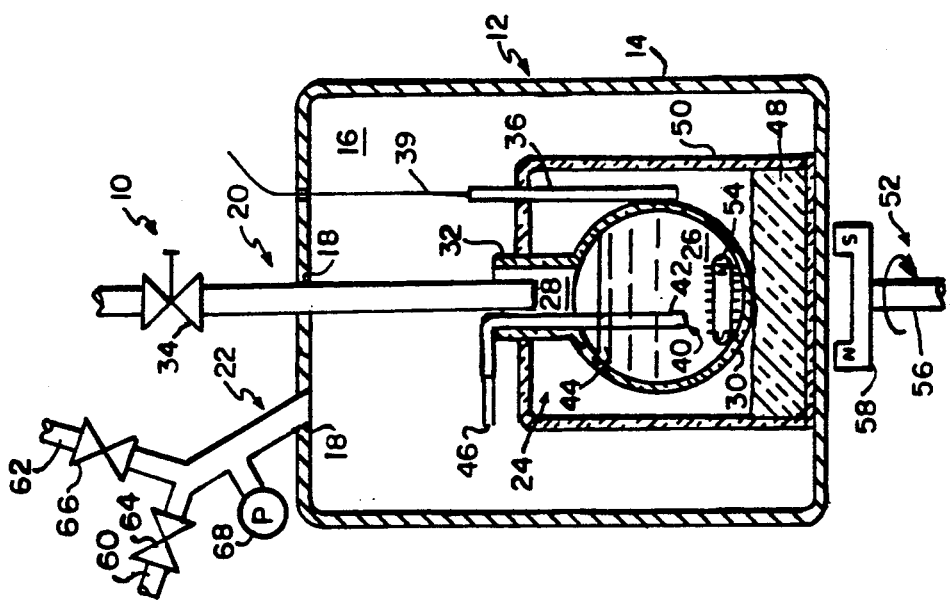
FIG. 1 is a vertical sectional view, partly diagrammatic in nature, and showing a preferred form of test apparatus embodying the invention.

Referring now to the drawings in greater detail, FIG. 1 shows a test apparatus, generally designated 10, for carrying out the method of present invention. As shown, the apparatus 10 includes an exterior containment vessel generally designated 12 and shown to include a plurality of imperforate wall portions 14 defining an enclosed space or interior atmosphere 16, the characteristics of which may be controlled and/or detected as described herein.

Suitable openings 18 are provided respectively in one or more of the walls 14 for passage of a fill pipe assembly generally designated 20 and an atmosphere control pipe generally designated 22. Another principal element of the test apparatus 10 is a receiver generally designated 24 for the reactive chemicals whose behavior is to be studied. In use, liquid ingredients 25 occupy the receiver interior and subdivide it into a subsurface area 26 and a headspace area 28. The ratio of the volumes occupied by the liquid 26 to the total volume of the receiver interior is referred to as the "fill fraction" of the receiver. In other words, the ratio of the liquid volume 26 to the total combined volume of the liquid and the headspace is known as the fill fraction. While this term is significant in full scale vessels, the tests here described are carried out with largely filled vessels and an assumption of an 80% fill fraction is made in designing the test equipment and procedures.

The body of the receiver 24 is defined by a thin spherical glass sidewall 30 surmounted by a reduced diameter neck portion 32. Filling the vessel is achieved by manipulating the valve 34 in the fill pipe 20 to allow filling from a remote supply of chemicals (not shown).

Means in the form of a probe 36 are provided for contact as at 38 with the sidewall 30 of the flask or receiver 24 for measuring the temperature of the liquid 25 therein. The probe 36 might also be disposed within the receiver 24; as long as an intimate heat exchange relation is provided for control purposes, the exact disposition of the probe 36 is not important. An electrical conductor 39 or the like is provided for connection to a control unit (not shown in FIG. 1; see FIG. 4) disposed outside the containment vessel 12.

In further keeping with the invention, means in the form of a heater element generally designated 40 are provided for disposition in the subsurface portion 26 of the liquid 25. The heater 40, as is customary, includes a resistance element 42 disposed within an exterior sheath 44. An upper portion of the heater unit 40 is secured to the neck portion 32 of the receiver 24, while the resistance element 42 is connected through wires 46 to a suitable source (not shown in FIG. 1) of electrical energy.

Also in accordance with the invention, means in the form of a blanket 48 of insulating material are provided to reduce the rate of heat transfer from the receiver 24 to the atmosphere 16 inside the containment vessel 12. In addition, a wall 50 of fiberglass cloth or like insulation material surrounds the remainder of the receiver 24 to retain heat within the receiver 24 or its immediate vicinity. The thickness and nature of the materials used in making the receiver are such that the receiver and its contents have a low "phi" or "$\phi$" factor.

This means that the thermal mass (mass x specific heat) of the receiver and its contents divided by the thermal mass of the contents alone is just greater than 1, e.g., 1.005 to 1.2. While the lowest possible number is preferred, numbers in the range of 1.05 to 1.10 are attainable in practice and are satisfactory. The $\phi$ factor should closely approximate that of the full-scale reactor and its contents.

Inasmuch as it is desired to reduce temperature gradients within the body of the liquid 25, means for continuously stirring or agitating the subsurface volume 26 of liquid 25 are provided in the form of an exterior stirring drive element generally designated 52 which cooperates with a freely positionable interior driven element 54. In the preferred form of apparatus, a rotary shaft 56 positions a transversely placed bipolar magnetic drive element 58 for rotation. When this unit rotates, the counterpart driven magnetic element 54, which is removably disposed in the liquid, will also undergo rotary motion and stir the liquid 25 in a known manner.

For changing, maintaining, sampling, or measuring the atmosphere 16 in the containment vessel 12, the atmosphere control pipe 22 includes means in the form of inlet or exhaust pipes 60, 62 for connection through valves 64, 66 to sources of air or other pressurizing fluid and a to vacuum source or exhaust unit, respectively. A pressure port 68 permits pressure sampling of the vessel atmosphere 16, positioning of a pressure transducer, and also permits a pressure relief valve to be fitted if desired.

From the foregoing, will be noted that, in general terms, the apparatus includes a containment vessel providing a controlled atmosphere surrounding a reactant material receiver, the contents of which are able to be infused, heated, stirred and their temperature determined while the receiver is insulated from significant heat loss. The arrangement of valves 64, 66 and the port 68 permits measuring interior pressure, as well as adding to or exhausting a gas or vapor atmosphere into the vicinity of the test cell.

The foregoing apparatus, termed an "RSST" or "Reactive System Screening Tool" is thus capable of providing a pressurizable test cell disposed within a single atmosphere-controlled containment vessel and capable of being operated manually or automatically under controlled conditions to heat the test cell contents at a low rate and determine the behavior of the contents under predetermined conditions.

A principal premise of the method of the invention is that the rate of increase in temperature with time (in the case of a vapor system) or the rate of increase in pressure with time (in the case of a gassy system) will occur as temperature and pressure increase, and that the rates of these increases are key elements in determining whether, when, and to what extent the reaction under study will begin and perhaps continue to runaway.

Accordingly, in establishing a base line for calculations, external heat is supplied to the test vessel at a low rate, but a rate which is calculated to and will supply a constant increase in temperature. Thus, if a target increase rate, such as 2° C. per minute due to external heat only, can be maintained, an increase in the self-heat rate can then be determined by taking the difference between the measured instantaneous heating rate and the heat rate attributable to application of external energy. In other words, correct attribution of temperature increase must be provided for so that the analytical method will operate properly.

Consequently, one or more test runs are normally made with non-reactive materials of the identical or nearly identical heat capacities so that the instantaneous rate of energy inflow necessary to maintain a constant rate of temperature increase may be established. Thereafter, when reactive chemicals are used, and the actual rate of temperature increase is plotted, it will be certain that the increase above the rate attributable to external energy only (i.e., the "base line") rate is attributable to reaction conditions only. Accordingly, control of the heat input to the reactants in the test apparatus is achieved according to this energy input rate program.

Accordingly, a necessary precondition for using the test apparatus and method of the invention is that the proper base line be established and that the temperature control equipment be able to replicate this rate of energy addition edition. Consequently, when a graph, chart, or other record of the rate of temperature increase with time is made, all deviations may be positively attributed to chemical conditions in the reactor and not to failure of insulation or other extrinsic cause.

Herein, and in the claims, the expression "constant rate of temperature increase" or words of like import are intended to describe a control system which, in the test apparatus in question, supplies enough energy instantaneously to achieve a predetermined, straight line or constant rate increase in temperature which will serve as a base line against which actual temperature increases may be compared or contrasted for the purpose of establishing self heat or gas generation rates attributable to the chemical reactants per se.

As referred to above, according to the invention, design calculations for relief systems can be accomplished using the RSST apparatus 10. Referring generally to the case of a vapor system, the maximum energy release rate or self-heat rate under certain conditions is determined. In the case of a gassy system or a hybrid system, the volumetric rate of gas generation under certain conditions is determined. From either of these figures, calculations of the vent size area needed at a given set point pressure are made. After these determinations, another formula is used to obtain vent sizing for systems of this type.

The RSST of the invention is normally used to determine whether a reaction vessel in existence and presently used for a given reaction can safely be used with new chemical reactants. The following table shows vent sizes in relation to the capacity of commonly used reaction vessels of standard design.

TABLE I

| TYPICAL VESSELS AND VENT SIZES USED FOR ORDINARY PROCESSES | |
|---|---|
| Vessel Size, (gal.) | Vent Diameter, (in.) |
| 50 | 2 |
| 100 | 3 |
| 200 | 4 |
| 500 | 6 |
| 750 | 8 |
| 1000 | 10 |
| 2000 | 12 |

In the above Table I, vent diameter only is shown; a full and accurate analysis of vent design also requires account to be taken of what may be referred to as a "shape factor" term used in the relief system equations discussed herein. In the following Table II, the L/D column represents the ratio of length to diameter of the pipe or tube downstream of the rupture disk, emergency valve or the like which extends between the vessel interior and the vessel outlet. As the L/D ratio increases, the shape factor or "F" term decreases. The values in this table simply reflect the concept that there is a certain finite degree of flow resistance within a relief system which is attributed to the conduit portion of the relief system; if a long, narrow pipe is provided, this pipe or conduit itself will create flow resistance, and other things being equal, proper relief will require an increase in the vent size.

TABLE II

| L/D | F |
|---|---|
| 0 | 1 |
| 50 | 0.85 |
| 100 | 0.75 |
| 200 | 0.65 |
| 400 | 0.5 |

In use of the above table, if L/D is significant, the "F" factor should be used.

Figure 2:
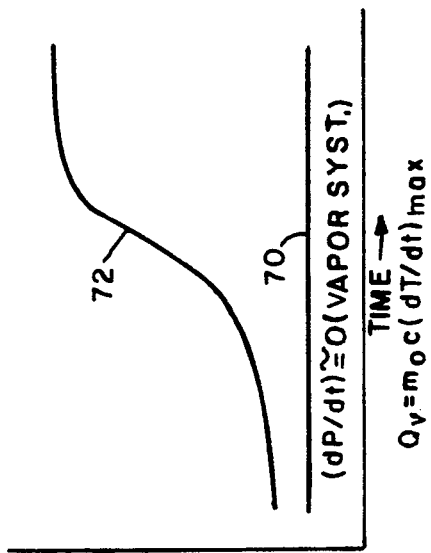
FIG. 2 is a schematic illustration of pressure-temperature and time-temperature relations for typical vapor or tempered vapor system reactions under study.

Referring now to FIG. 2 of the drawings, a graph of a so-called vapor system and a formula pertaining to the energy release or self-heat rate applicable thereto are set forth. Here, the lower line 70 appearing on the graph is relatively straight, and the upper line 72 shows definite points of inflection. An equation is set forth beneath the graph in FIG. 2, as follows: $Q_v = m_o c (dT/dt)_{max}$ In this formula, $Q_v$, the value sought, represents the energy release or self-heat rate in Joules/sec., $m_o$ equals the mass in kilograms of the reactant in the process application, i.e., the mass in the full scale projected reaction. The term c is the specific heat of that reactant in Joules per kilogram-degree and $(dT/dt)_{max}$ is the measured maximum rate of temperature rise in degrees Centigrade per second.

Referring again to FIG. 2, another assumption is implicitly set forth in line 70, and that is that the rate of pressure increase with respect to time, in a vapor system, as tested by the apparatus of the present invention, is substantially zero. This is because, when tested in the apparatus shown, the walls 14 of the exterior containment vessel 12 are relatively cold, and heating is confined to the interior of the receiver 24, which in turn is surrounded by thermal insulation. Thus, as the temperature increases, whereas more vapor is generated and the vapor pressure of the liquid rises, the large area, low temperature surfaces of the sidewalls 14 act as vapor condensing surfaces, the atmosphere pressure in the interior of the vessel 12 does not rise greatly with the passage of time.

Referring now to the practice of the invention in the apparatus shown in FIG. 1, and assuming that a vapor system is to be tested, a desired size specimen is placed in the receiver 24, which is preferably of the 10 ml size. Once the receiver 24 is largely filled with liquid 25, the atmosphere 16 in the containment vessel 12 is pre-pressurized through line the atmosphere control pipe 22 by manipulating the valve 64 such that the pressure appearing at the pressure measurement port 68 is equal to the set point pressure of the proposed relief system.

At the same time, gradual heating of the vessel content begins by energizing the heating element 40, which delivers heat at the rate, referred to above, which is calculated to produce an even, 2° per minute rise. As heat is supplied, the increase in temperature is measured. As pointed out, were the liquid not to undergo any chemical reaction, its rate of temperature increase would be completely constant at a predetermined rate, say 2° C. per minute. The actual temperature increase of the reactants under study is then measured and recorded, as with a computer or strip chart recorder.

This heating and measurement continues until the set pressure is reached, or until the rate of temperature increase with time has shown a significant increase followed by a decrease. (FIG. 2) Having thus experimentally determined the rate term $(dT/dt)_{max}$ of the above formula, the quantity $Q_v$ may be determined. This is the self-heat rate which is to characterize the system under study. Next the self-heat rate thus determined is used in in the following formula:

$$A = \frac{5}{2} \frac{Q_v}{F(Tc)^{\frac{1}{2}} P_{set}}$$

Where
A = Vent area in square meters
$Q_v$ = Energy release or self-heat rate in Joules/sec @ $P_{set}$
F = "Shape Factor" from Table II
$P_{set}$ = Relief Set Pressure in Pascals (kg/m$^2$)
T = Temperature in °K. at which Relief Pressure is reached
c = Specific heat of reactant at T in Joules/kg°

When the correct substitutions have been made, the vent area in square meters appears as term A, the solution. Simply comparing this area with the area provided by the equipment proposed for use enables the user to determine whether the selected vessel and its relief system are adequate. In most cases, the parameters of the proposed reaction will indicate that the existing system is fully adequate or very inadequate. In those rare instances wherein a borderline case appears, a more exhaustive analytical method may be used. However, as pointed out above, this is rarely necessary.

For illustrative purposes, the figures applicable to the reaction of two known organic liquids, whose self-heat characteristics are set out herein, will be considered. For this purpose, reference is also made to FIG. 5.

The curve shown in this illustration depicts, on the left side, a logarithmic scale of ascending self-heat rates, i.e., the rate in degrees centigrade per minute; the x-axis of the chart, which is likewise not linear, shows the temperature in degrees centigrade. Consequently, it will be noted that after an initial phase in which the self-heat rate drops and heat is absorbed, the self-heat rate continually increases. The self-heat rate is just over 1° C. per minute at 50° C., it is just over 2° C. per minute at 60° C., 5° C. per minute at about 74° C. and in excess of 10° C. per minute at approximately 84°. At approximately 95° C., the heat rate is 15.8° C. per minute. Afterwards, with further increasing temperature, the self-heat rate drops drastically. This may indicate that the reaction has run its course or be accounted for by some other cause. At any rate, an illustrative calculation using the data of FIG. 5 will now be set forth. The actual process vessel proposed to be used is a 500 gallon vessel having a requirement for a relief vent discharge pipe of significant length. It is anticipated that a 3,000 pound charge of reactants will be placed in the vessel, that such reactants have a specific heat of 2,000 J/Kg°K. The actual L/D ratio of the relief vent discharge pipe is 400 to 1. The desired set pressure at which the rupture disk will fail is 15 psig.

Figure 5:
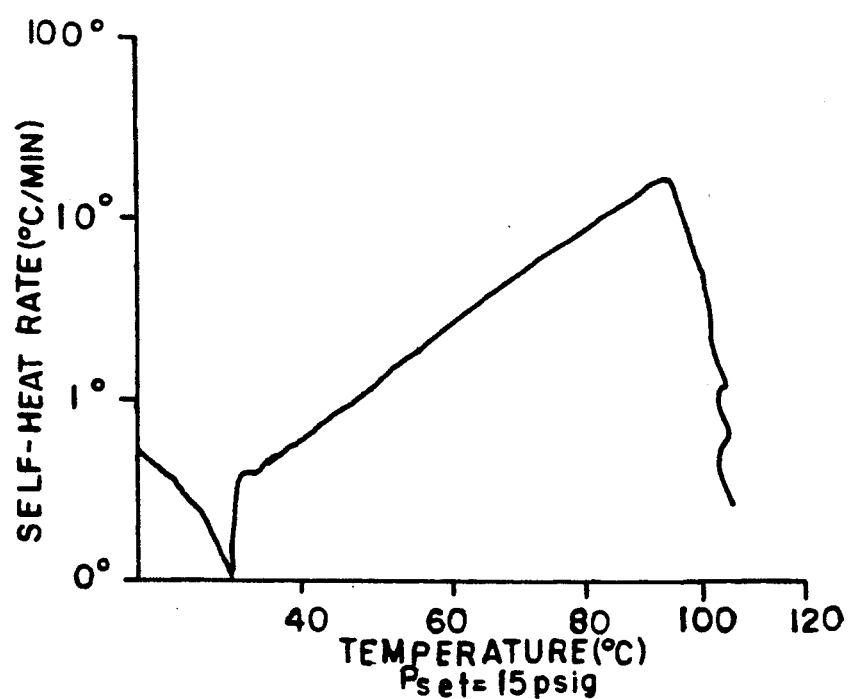
FIG. 5 is a graph showing the relation of self-heat rate to temperature under a set relief pressure.

Using the apparatus of the invention, the self-heat rate data shown in FIG. 5 were developed using a constant exterior containment vessel pressure of 15 psig, selected so as to coincide with the set pressure. The reaction under study is a tempering reaction at 95° C., i.e., the chemical energy release rate is in substantial equilibrium with the cooling provided by evaporation of the solvent. This would be the case for a vapor system in the actual process vessel. At the 95° C. tempering point, the self-heat rate measured in the RSST of the invention, and found to be 15.8° C./min.

Using the foregoing formulas, calculations were made with the following substitutions: the mass of reactants, 3,000 pounds, is converted to kilograms and equals 1,361 kg. The above set pressure, 5 psig, expressed in absolute pressure terms of the above equations equals $2.048 \times 10^5$ Pa. The set point temperature, 95° C., expressed in degrees K., equals 368° K. As pointed out, the maximum rate of temperature increase with respect to time at the pressure set point was equal to 15.8° C./min. This is, in terms of the equation, is 0.263° K./sec. The shape factor term, "F", equals 0.5, taken from Table II. This factor is indicated by the L/D ratio of 400. The specific heat of the reactants is 2,000 J/Kg°K. Using the first formula set out above, the value for "Q" or the self-heat rate or energy release rate therefore equals $7.2 \times 10^5$ J/sec.

A further substitution of the "Q" value into the vent area formula simply involves placing the "Q" term, $7.2 \times 10^5$, in the numerator and the remaining terms in the denominator, as follows. Solving this equation shows A equal to 0.020 m squared. Expressed inches, this is a diameter of 6.3 inches.

From these calculations, if the process vessel has a vent type larger than 6.3 inches in diameter, the relief system is acceptable.

The proposed vessel, if existing, could be evaluated on this basis. If a new vessel were to be designed, then a vent pipe at least 6.3 inches in diameter would be required. Of course, were other design parameters changed, then the acceptability of a proposed vessel would need reevaluation.

For systems which may be referred to as gassy or low vapor pressure systems, or hybrid systems, as pointed out, other equations, which will now be discussed, are applicable. In these systems, the shape factor chart is somewhat different, having the values set forth in Table III below:

TABLE III

| L/D | F |
|-----|------|
| 0   | 1    |
| 50  | 0.7  |
| 100 | 0.6  |
| 200 | 0.45 |
| 400 | 0.33 |

The initial calculations in the case of a gassy system involve solving for the self-heat rate or energy release rate for a gassy system, referred to as $Q_g$, in the equation set forth below, which also appears beneath the graph in FIG. 3 of the drawings:

$$Q_g = \frac{m_o}{m_t} \frac{v}{P} (dP/dt)_{max}$$

Figure 3:
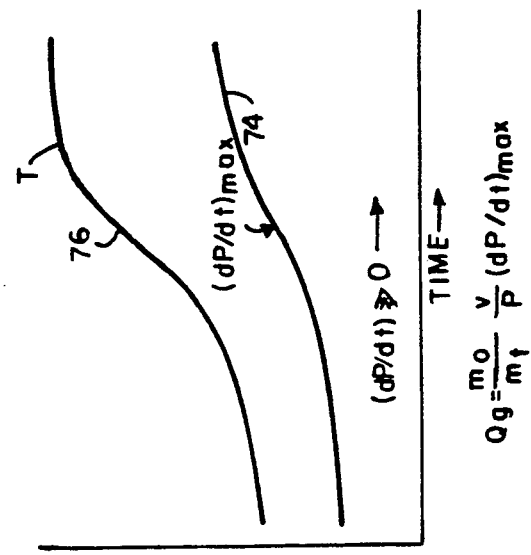
FIG. 3 is a schematic illustration of time-temperature and time-pressure relations for so-called gassy or hybrid reaction systems.

Referring to FIG. 3, it will be noted that the one base line, 74, shows that the change of pressure with respect to temperature is not a constant, but is significantly greater than zero and increases as time elapses. At one point, the rate of pressure rise achieves a maximum.

Referring to the line 76 on the graph forming a part of FIG. 3, it will be noted that the temperature also increases at a varying rate with the elapse of time in a gassy system.

Referring now to the use of the test equipment 10, materials characterized by a gassy reaction are introduced through the fill pipe system 20 by appropriate manipulation of the valve until a liquid 25 to be evaluated is contained within the receiver 24. Unlike the vapor system, when the temperature increases in a gassy system, the pressure in the containment vessel will rise substantially because the gas phase being generated will be a non-condensable gas rather than a readily condensable vapor.

Readings are taken at the pressure port 68, and the valves 64, 66 are manipulated so that the desired content and pressure of the atmosphere 16 are present in the interior of the containment vessel 12. As the temperature is increased, temperature and pressure measurements are made and charted, with the heat energy addition controls being programmed such that external energy is being added at a rate calculated to produce a constant rate of temperature rise. A plot is made, as in FIG. 3, of the change in pressure with time.

The equation set forth above is then solved after an appropriate substitution of terms is made; $m_o$ is the mass of reactant in kilograms to be used in the process application $m_t$ is the mass of reactant in the test cell. V is the volume of the exterior or containment vessel in cubic meters, P is the pressure measured in the containment vessel, expressed in Pascals, and dP/dt(max), is the maximum rate of pressure rise, expressed in Pascals/sec. When these substitutions are made after measurements are taken, the gas generation rate $Q_g$, denoting the rate applicable to a gassy reaction, is available for substitution into the vent system development equation applicable to gassy or hybrid reactions. This expression is as follows:

$$A = \left(\frac{1}{2}\right)^{\frac{1}{2}} \left(\frac{Q_g}{F}\right) \left(\frac{\rho}{P}\right)^{\frac{1}{2}}$$

In this general equation, the term A being solved for is also the area, expressed in square meters. The $Q_g$ term is taken from the previous calculation; the "F" or shape factor term is taken from Table III. The reactant density is expressed in kilograms per cubic meter (rho). The pressure term forming the denominator of the $\rho/P$ term, in the case of a low vapor pressure system, is a pressure equal to the difference between the maximum allowable venting pressure and the back pressure or ambient pressure, expressed in Pascals. In the case of a hybrid system, this P or pressure term is equal to the maximum allowable venting pressure minus the relief set pressure. For low pressure vapor systems, a determination is done at maximum venting pressure, while with a hybrid system, a determination is made at the set pressure.

Figure 4:
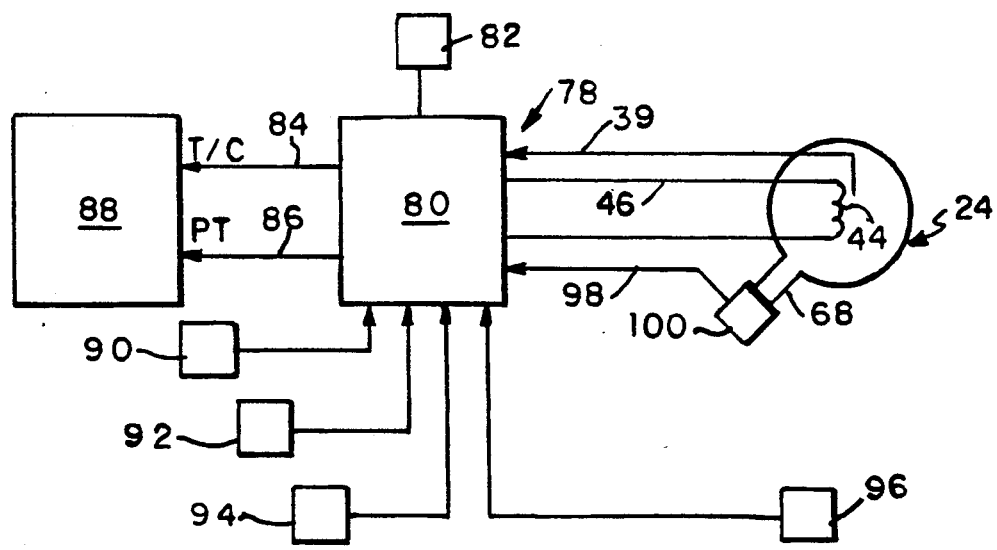
FIG. 4 is a schematic view of certain portions of a control system which is useful with the present invention.

Referring now briefly to FIG. 4, a schematic view is shown of a thermal control apparatus of the invention, generally designated 78.

The control apparatus 78 is shown to include a main control unit 80 having input from an appropriate power supply, such as a 120 volt AC source 82, and will have two output signal carriers, a temperature signal sending line 84 and a pressure signal sending line 86, each connected to a recording means 88 such as a strip chart recorder or a computer. Additional inputs to the control 80 include a power on/off switch 90, a heater on/off switch input 92, one or more calibration inputs 94 for adjusting the amplifier circuits of the unit 80, and preferably, an external energy rate control input from a computer program 96. Alternatively, other sources might be used. In addition, FIG. 4 shows that conductors 46 are provided for connection to the resistance element 42 of the heater unit 40, and that a conductor such as the electrical conductor 39 extends from the interior of the receiver generally designated 24 to the control unit 80. Still further, a line 98 is shown to extend to the control unit 80 from a pressure transducer 100 located at the pressure port 68 of the exterior containment vessel.

The temperature detector probe 36 of FIG. 1 is connected as by conductor 39 to the control unit 80 so that an appropriate temperature output signal will be continuously furnished to the recorder 88. Likewise, if pressure is being measured at the port 68 by the transducer 100, an indication of pressure will be furnished through line 98 to the control 80 and transduced, amplified, or otherwise dealt with as necessary to create a pressure intensity signal for the recorder 88.

The remaining inputs, including the power from the source 82, on/off switches for the heater and the power, and the calibration inputs are conventional.

The schematic representation of the program source 96 illustrates that this control is utilized to ensure that the correct amount of energy is furnished through the conductors 46 to the resistance element 42 to achieve the steady temperature increase profile required so that it may be compared with the heat from the reaction. Any form of program based on a properly developed heat/temperature history is appropriate.

It will thus be seen that the present invention provides a novel test apparatus and method for chemical engineering analysis, said apparatus and method having a number of advantages and characteristics, including those pointed out herein and others which are inherent in the invention. Preferred embodiments of the invention having been described by way of example, it is anticipated that modifications may be made to the described form of apparatus and methods without departing from the spirit of the invention or the scope of the appended claims.

I claim:

1. A test apparatus for studying the behavior of chemical reactants, said apparatus comprising, in combination, an exterior containment vessel, a reactant receiver of a given thermal mass disposed within said exterior containment vessel and receiving in use a predetermined quantity of reactants to be studied, said quantity of reactants also having a given thermal mass, a record of a predetermined rate of temperature increase of a chemically inert thermal mass nearly identical to the total thermal mass of said receiver and said reactants under study, means for introducing said reactants into said receiver, vessel thermal insulation surrounding said receiver to inhibit heat transfer from said receiver, temperature sensing means disposed in intimate heat exchange relationship with said reactants in said receiver, heating means disposed within a portion of said vessel thermal insulation, a source of external energy and a connection between said external energy source and said heating means within said receiver, control means disposed between said external energy source and said receiver having an energy rate control input for replicating the predetermined rate of temperature increase in the chemically inert thermal mass and thereby instantaneously feeding to said heating element an amount of energy which will cause the predetermined rate of temperature increase in the chemically inert thermal mass, and comparison means disposed outside said exterior containment vessel and operatively attached to said temperature sensing means for comparing the rate of increase in temperature of said reactants and said receiver with the rate of increase in temperature of said inert thermal mass, whereby the rate of temperature increase due to chemical reactivity may be determined, so that the self-heat rate of each ingredients may be determined for vent mixing calculations.

2. A test apparatus as defined in claim 1 wherein said receiver comprises a thin wall glass flask unit with a thermal mass of less than one-tenth the thermal means of said reactants.

3. A test apparatus as defined in claim 1 which further includes means for introducing reactants into said reactant receiver in the form of a fill pipe extending through a wall portion of said containment vessel, said fill pipe having one of its ends disposed within the interior of said receiver and the other of its ends disposed on the exterior of said vessel, said fill pipe further including at least one manually controllable valve for controlling passage of reactants through said fill pipe.

4. A test apparatus comprising, in combination, an exterior, gas tight containment vessel adapted to provide a controlled atmosphere therein, a reactant receiver disposed within said exterior containment vessel and adapted to receive a predetermined quantity of reactive ingredients, a record of a predetermined rate of temperature increase of a chemically inert thermal mass nearly identical to the total thermal mass of said receiver and said predetermined quantity of reactive ingredients, temperature sensing means disposed in intimate heat exchange relation with the contents of said reactant receiver, a heating element disposed within a portion of said vessel, said receiver being surrounded by thermal insulation to prevent ready transfer of heat from the said receiver interior to said atmosphere within said exterior containment vessel, conduit means providing for fluid flow between the atmosphere outside said exterior containment vehicle and said atmosphere outside said exterior containment vehicle and said atmosphere within said containment vessel, whereby conditions of the gas or vapor atmosphere within said containment vessel interior may be controlled and measured, means for measuring the atmospheric pressure of said containment vessel interior from time to time, means having an energy rate control input from the record for replicating the predetermined rate of thermal increase in the chemically inert thermal mass and adding heat to said receiver such that said receiver and its contents, if of the same mass as the reactive ingredients being studied, will undergo a temperature rise at a constant rate, and means disposed outside said exterior containment vessel for measuring and recording the rate of temperature increase of said ingredients within said receiver, and for determining the rate of pressure increases due to chemical reactivity and the gas generation rate of such reactants.

* * * * *